June 24, 1930.    E. L. GODFREY ET AL    1,768,197
EGG TURNING TRAY FOR INCUBATORS
Filed May 19, 1927    4 Sheets-Sheet 1

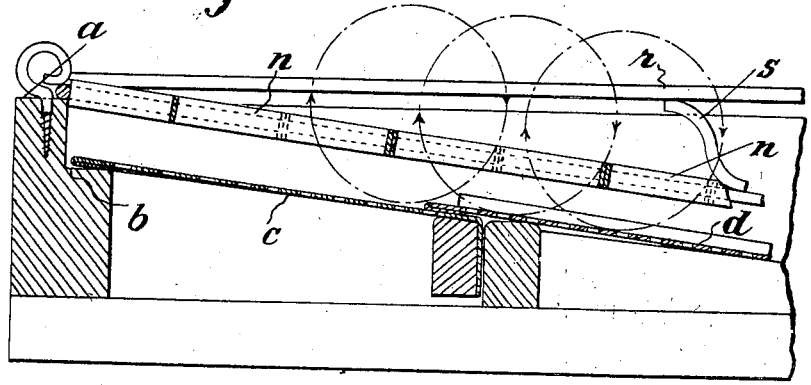
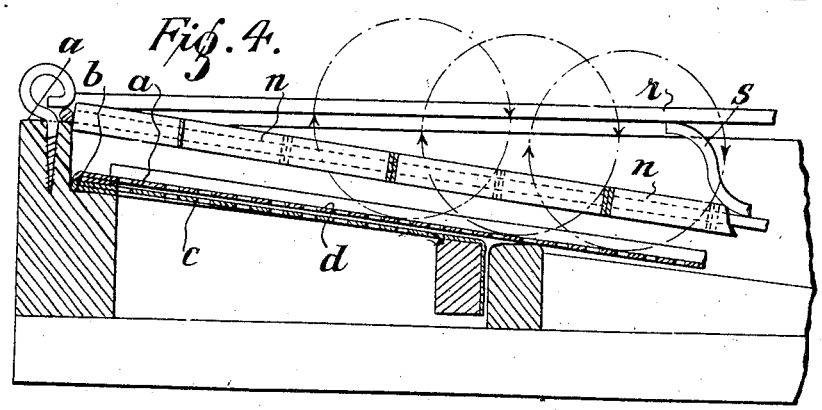
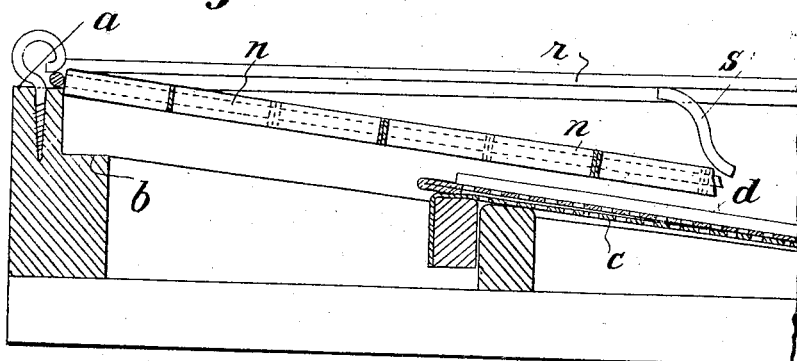

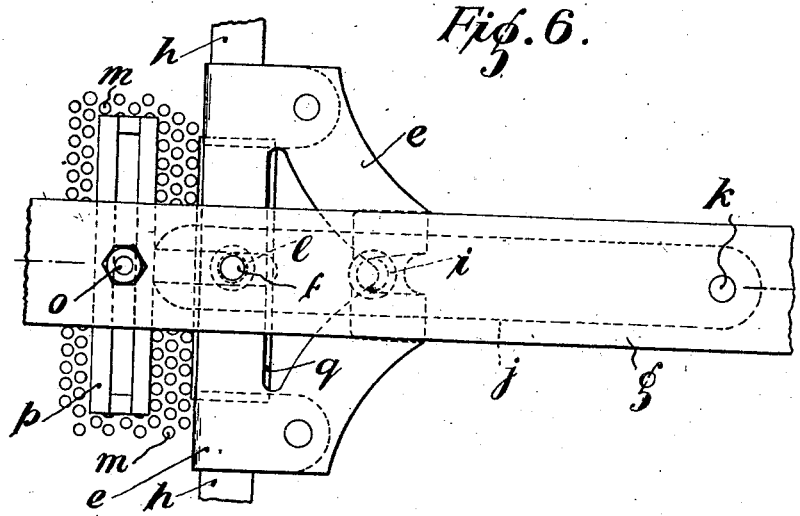
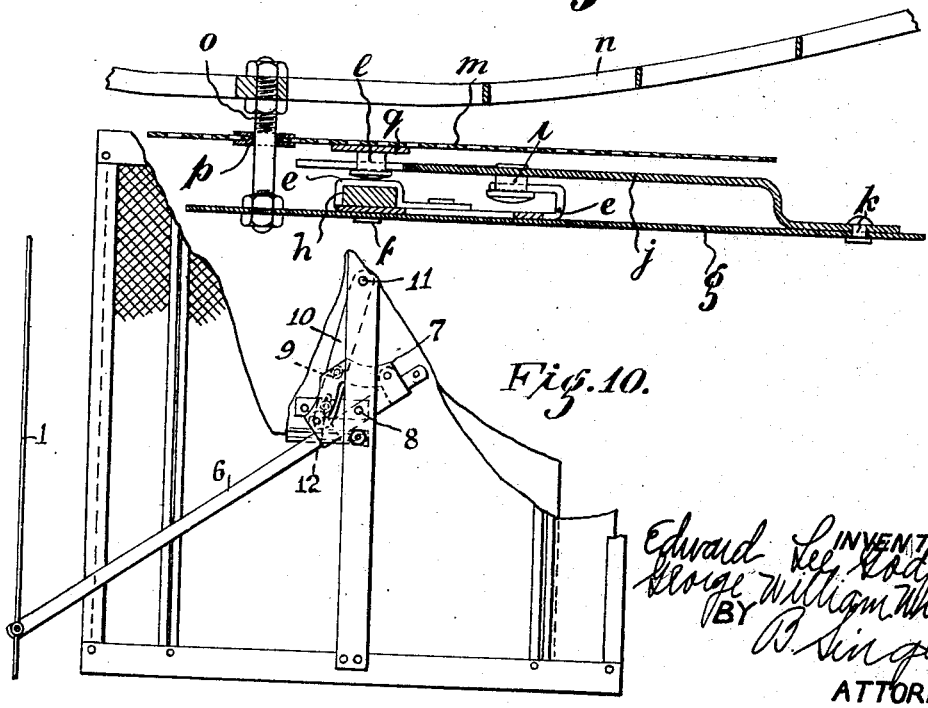

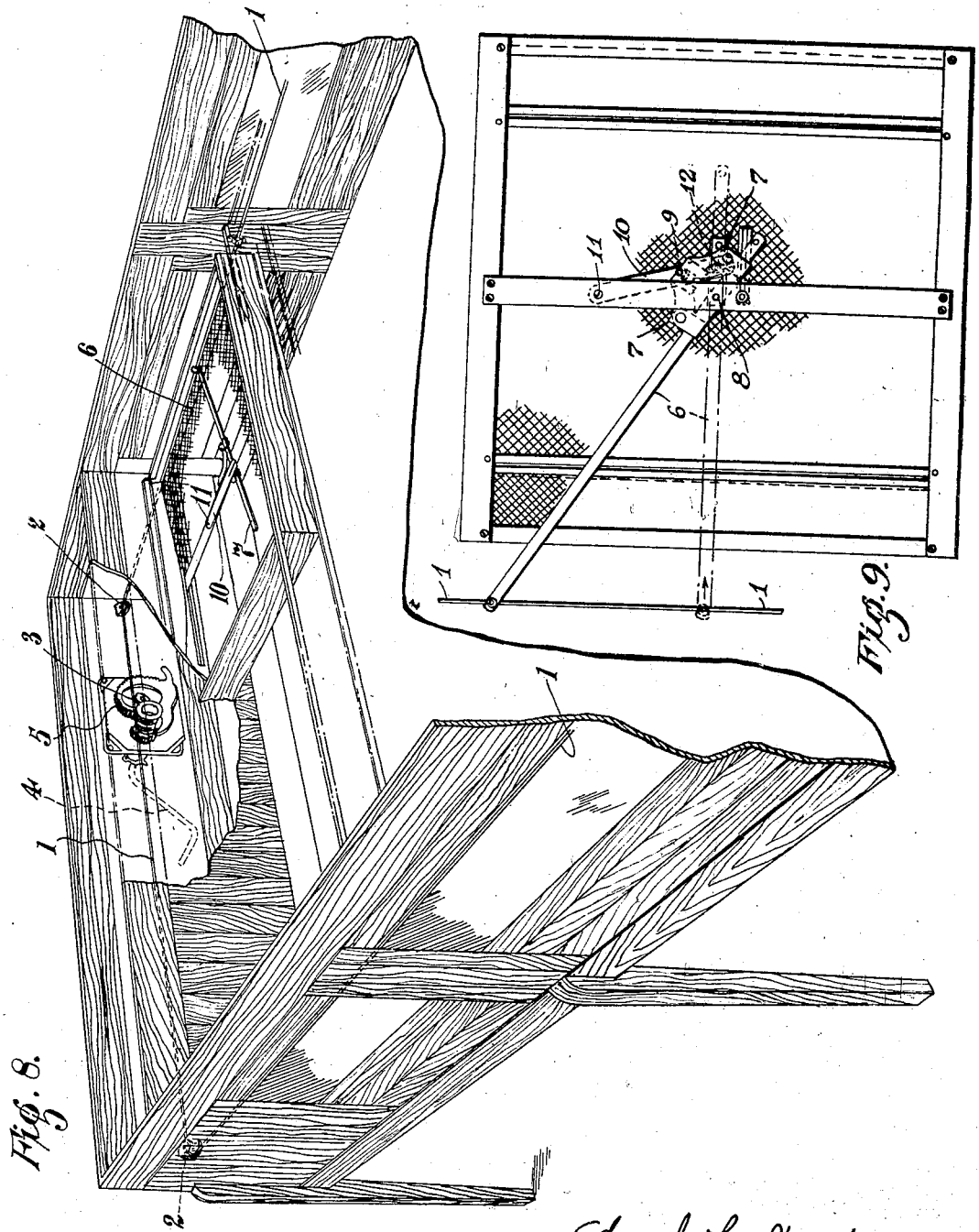

Patented June 24, 1930

1,768,197

UNITED STATES PATENT OFFICE

EDWARD LEE GODFREY AND GEORGE WILLIAM WRENTMORE, OF STROUD, ENGLAND

EGG-TURNING TRAY FOR INCUBATORS

Application filed May 19, 1927, Serial No. 192,732, and in Great Britain June 29, 1926.

This invention relates to improvements in incubators, the object being to effect improvements in the construction of the egg tray and to also effect improvements in means for moving the bottom member of the tray to turn the eggs as required during the incubating period.

With the above and other objects in view, the invention consists in the construction, combination and arrangement of devices hereinafter described and claimed.

In order that this invention may be clearly understood and readily carried into practice reference may be had to the appended explanatory drawings which illustrate one construction and on which—

Figure 3 is a fragmentary view on an enlarged scale corresponding with the left hand side of Figure 2 and illustrating diagrammatically the position which the eggs assume when the supporting screen is in one position.

Figure 4 is a view similar to Figure 3 with the parts in the position which they assume when the movable screen is in its other extreme position.

Figure 5 is a view similar to Figures 3 and 4 but illustrating a variation in the arrangement of a part hereinafter more particularly referred to which may be made at the hatching period.

Figure 6 illustrates on an enlarged scale a detail of the mechanism shown in Figures 1 and 2.

Figure 7 is a sectional elevation of the mechanism shown in Figure 6.

Figure 8 illustrates in perspective an embodiment of the present invention as applied to a mammoth incubator.

Figure 9 is a fragmentary plan view on an enlarged scale of a part of the apparatus shown in Figure 8.

Figure 10 is a fragmentary plan view corresponding with Figure 9 but showing the mechanism in its extreme position.

In a convenient embodiment of the present invention the tray comprehends a square or rectangular frame $a$ having a ledge $b$ at an intermediate position in its depth, which ledge supports at each side of the frame a marginal screen $c$ of perforated sheet metal. Above these two marginal screens $c$ a main screen $d$ of perforated sheet metal is adapted to slide transversely to the length of the marginal screen.

For the purpose of reciprocating the supporting screen we may, according to one arrangement, employ a member $e$ which is swivelled to move about a fixed axis $f$ mounted for instance on a transverse strut $g$ and provided with a crank-like portion which has a pin and slot connection with the screen. By rocking or oscillating the member $e$, a rectilinear movement is imparted to the main screen $d$. The member $e$ may have an operating rod $h$ sliding longitudinally in relation thereto. This operating rod may at the extreme positions of the rocking member project beyond the boundary of the tray and thus permit of rocking action by hand or otherwise from the outside of the incubator; the rod may pass through an elongated slot or opening in the casing, the size of which is not calculated to appreciably affect the temperature to be maintained in the interior. When the tray is placed in the incubator in a reverse position the operating member proper may be slid longitudinally in relation to this frame and then operated from the other side of the tray in manner such that it does not foul the side of the tray which is for the time being at the back. In the specific construction illustrated the member $e$ co-operates at $i$ pivotally with a lever $j$, which is pivoted at $k$ to the strut $g$ and which lever $j$ has a pin and slot connection at $l$ with a stud fixed upon the screen $m$ which in the case illustrated takes the form of a perforated sheet of metal. In Figure 7 $n$ represents the locating device incorporating a multiplicity of oval frames. This member $n$ carries a fixed stud $o$ which passes through an elongated slot in the frame $p$ mounted in the base member $m$ so that the latter is enabled to move in a rectilinear path by virtue of the lever mechanism already described. $q$ is a plate which is attached to the member $m$ for the purpose of mounting the pivot at $l$.

In the case of an incubator incorporating a unitary chamber it is desirable that the screen and the egg locating frame should be of curved or dished formation in one section so that a cradle-like configuration obtains whereby the eggs at the sides of the chamber receive an appropriate amount of heat.

Figure 1:
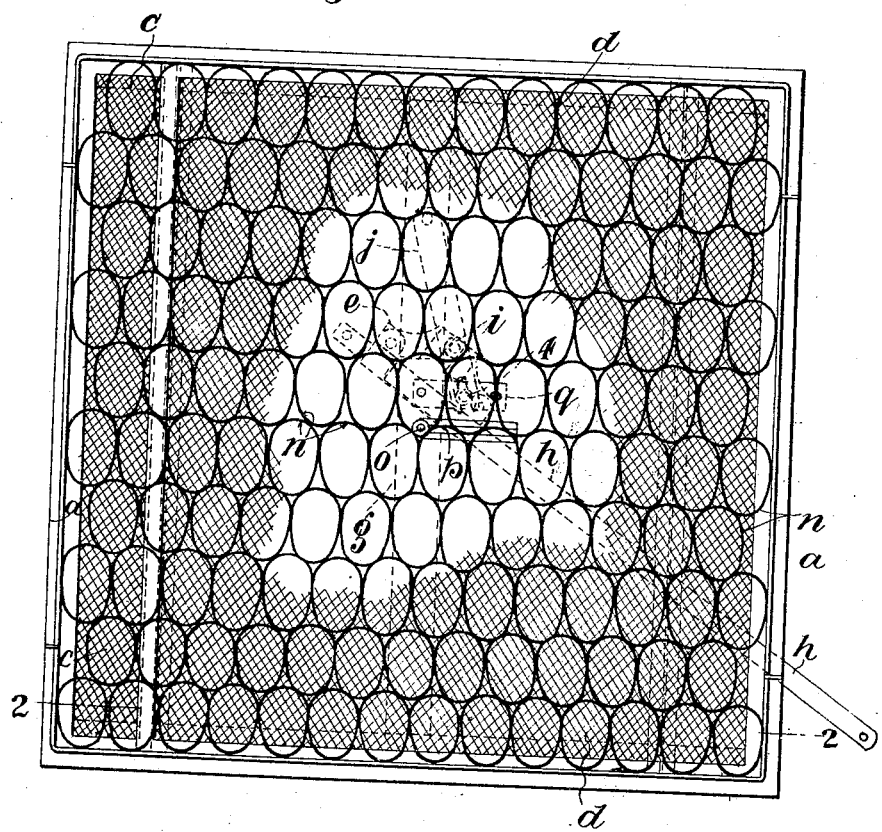
Figure 1 is a plan view of the egg turning tray omitting the reinforcing rods.
Figure 2:
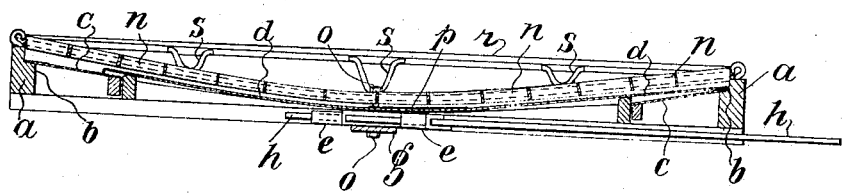
Figure 2 is a sectional elevation of the tray shown in Figure 1, the plane of section being on line 2—2 of Figure 1.

This invention is applicable to such a structure by virtue of the utilization of a screen which is shaped in one of its sections like the arc of a circle so that it can be laterally displaced in the manner already defined in connection with the screen, the mesh of which is in a plane surface. In order to secure the member $n$ in its cambered position as shown in Figure 2 it may be reinforced by struts $r$ having locating portions $s$ which by brazing, soldering or other appropriate expedient are connected both to the struts and to the cambered member $n$.

In the drawings we have illustrated as one convenient means of securing the member $n$ a series of screwed eyes. We may alternatively adopt other securing means such as projecting tongues appertaining to the grid which are perforated and adapted to be secured upon screwed pins mounted in the frame $a$ and fastened by nuts. It is very desirable that when the apparatus is in use the member $n$ should appropriately be located in relation to the frame $a$, and for this reason it is desirable effectually to anchor it around the boundary of the tray. This anchorage in conjunction with the anchorage afforded by the pin $o$ ensures that notwithstanding the movements to which the parts of the apparatus are subjected the grid $n$ retains its correct position in relation to the movable member $d$.

We have mentioned manipulation by hand or other means, and the present invention comprehends manipulation by expedients such as clockwork or by the use of an electric motor, these expedients being applicable to the present invention either individually with each incubator unit or collectively with an aggregation of units or the entire system of units which occur in a mammoth incubator.

The marginal screens $c$ which may be located by shoulders in the ledge which is provided in the tray frame may be furnished with flanges $t$ and immediately before the hatching period one of these marginal members may be displaced inwardly thereby to allow the chickens after being hatched to obtain access to the apartment below the screen upon which the eggs have been located. In the embodiment shown the marginal member $c$ assumes the position shown in Figures 3 and 4 during the period of incubation after which they may be reversed, so that they assume the position shown in Figure 5 at the hatching period.

In a convenient embodiment of the present invention as applied to a mammoth incubator incorporating two series of compartments in parallelism, we employ a cable 1 extending entirely around the incubator and passing around pulleys or rollers 2 at each corner thereof. At its meeting ends this cable is combined with a drum 3 actuatable by a crank or operating lever 4 through the intermediary of a gear wheel 5 by the rotation of which lever the cable may be displaced longitudinally in its path around the incubator. At any suitable point in the length of the cable we may also incorporate a cable strainer which may be of the turn-buckle type adapted to take up slackness if necessary. For securing the cable at the different points in its length to the several operating levers we may, according to one arrangement, provide that the cable passes through a lateral perforation in a stud which in turn passes through a perforation in the end of the operating lever 6.

The flexibility of the cable or the equivalent may provide for the arc of movement of the operating lever 6 but alternatively or additionally we may employ a telescopic arrangement. Thus the mechanism may incorporate a lever comprehending a member sliding in a frame 7 which latter has a fixed axis 8 of movement and the lever may have a projecting lug which co-operates with another transversely located lever also having a fixed axis of movement 8, which transversely located lever is adapted to co-operate by a fork engagement at 9 with a lever 10 having a fixed axis 11 and which lever 10 also has a fork engagement at 12 with the rectilinearly moving element of the egg tray.

Details of the parts thus briefly referred to in connection with Figures 8, 9, and 10, will be more fully understood after a comparison of these figures with Figures 6 and 7. Other expedients may be adopted for transmitting the movement of the cable or flexible inextensible member to the frame or part by which the egg turning function is fulfilled, the methods already described having been referred to as suitable examples. In addition other expedients may be employed for imparting endwise movement to the cable 1. Thus the cable 1 may comprehend an endless member anchored appropriately to a lever by which it may be displaced in the direction of its length, or it is then possible to displace the cable by application of effort by the hand directly to the cable itself. On the other hand the necessary power for displacing the governing cable or the equivalent may be imparted by any suitable source of mechanical power. It should also be understood that while a flexible member has been suggested as a convenient mechanism by which collectively to operate the several turning mechanisms, other expedients may be employed such for instance as a rigid shaft or series of shafts having bevel or other gearing with shafts which by co-operation with a lever or other expedient such as worm actuation are adapted to impart the desired oscillatory movement to the part of the egg tray which it is desired to displace.

It is desirable to incorporate means which stop the movement of the apparatus in both directions. In the embodiment illustrated it will be seen that the wheel 5 is formed with a pair of horns which by co-operation with the pinion on the operating crank 4 serve to perform this function.

Having described our invention what we claim and desire to secure by Letters Patent is:—

1. In an incubator, an egg tray comprising a frame, a strut extending across the lower side of said frame, a relatively fixed grid supported by the frame, a movable bottom member spaced below the grid and provided with a slot, a stud connecting said strut and said grid and extending through said slot and means mounted on said strut and active to move said bottom member.

2. An incubator tray as claimed in claim 1, in which said moving means comprises a stud depending from said bottom member, a member pivotally mounted on said strut and having a stud and also having a slot in which the stud of said bottom member engages, a crank member pivotally mounted on said strut and having a slotted arm in the slot of which said second named stud engages and a lever connected to said crank member and by means of which said crank member may be oscillated.

In witness whereof we affix our signatures.
E. L. GODFREY.
G. W. WRENTMORE.